Figure 1:
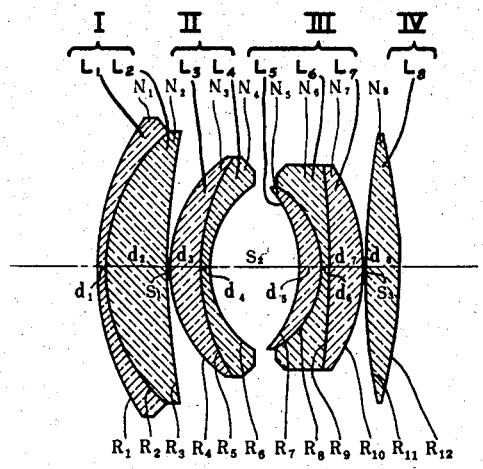

March 1, 1960

JIRO MUKAI 2,926,564

HIGH APERTURE WIDE ANGLE OBJECTIVE

Filed July 31, 1957

SPHERICAL ABERRATION
DEVIATION FROM SINE
CONDITION

ASTIGMATIC ABERRATION

DISTORTION

INVENTOR.
JIRO MUKAI
BY
ATTORNEY

United States Patent Office 2,926,564
Patented Mar. 1, 1960

2,926,564

HIGH APERTURE WIDE ANGLE OBJECTIVE

Jiro Mukai, Kohokuku, Yokohama, Japan, assignor to Canon Camera Company, Inc., Tokyo, Japan, a corporation of Japan Application July 31, 1957, Serial No. 675,354

Claims priority, application Japan October 5, 1956

2 Claims. (Cl. 88—57)

The present invention relates to a photographic objective and more particularly to a high aperture wide angle objective.

It is an object of the present invention to provide a high aperture wide angle objective with high efficiency and high precision.

It is another object of the present invention to provide a high aperture wide angle objective having remarkable correction of spherical aberration and other aberrations in image curvature and the like.

Figure 2:
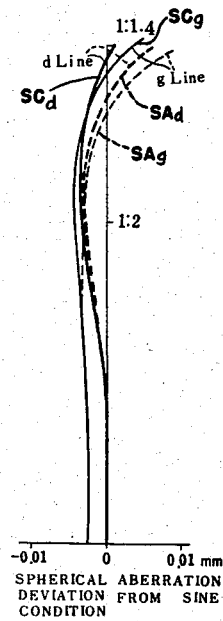
Figure 3:
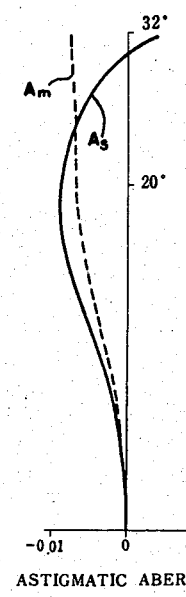
Figure 4:
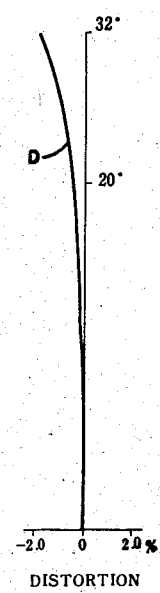

Other objects and advantages of the present invention will become apparent from the description hereinafter following and the drawing forming a part hereof, in which:

Fig. 1 shows an illustrative embodiment of the high aperture wide angle objective according to the present invention, and Figs. 2, 3 and 4 are graphs of the sine condition of the corrected spherical aberration, astigmatic aberration and distortion, respectively, of said objective.

It is a particular object of the present invention to provide a high aperture wide angle objective, with an image angle of 63° and an aperture ratio of almost 1:1.4, which has the remarkable advantage of highly correcting spherical aberration, and other aberrations in image curvature and the like, utilizing a new system of structure and arrangement of newly invented glass in photographic objective comprising four components.

The high aperture wide angle objective according to the present invention, of which an illustrative embodiment is shown in Fig. 1, comprises four axially aligned components consisting of eight lenses, the first component I being positive and comprising negative lens $L_1$ cemented to positive lens $L_2$, with its cemented surface $R_2$ of converging power turned convexly towards the object, the second component II being of negative power and meniscus shape and consisting of positive lens $L_3$ cemented to negative lens $L_4$ and having its convex outer surface of radius $R_4$ towards the object, the third component III being of negative power and meniscus shaped and consisting of three lens elements $L_5$, $L_6$, and $L_7$, cemented in the order of positive, negative and positive lens elements with its concave outer surface of radius $R_8$ turned towards the object, and the fourth component IV of a bi-convex positive lens $L_8$. Denoting the overall focal length of the objective by F, the radius of curvature of the lens surface of each element in the order of the alignment by $R_1$, $R_2$, ... the refractive index on the spectrum d-line of each lens element in the order of the alignment by $N_1$, $N_2$, ... the axial thickness of the lens element at the optical axis in the order of the alignment by $d_1$, $d_2$, ..., and the axial thickness of the air spacing between adjacent surfaces of each component at the optical axis in the order of the alignment by reference symbols $S_1$, $S_2$, ... the high aperture wide angle objective according to the present invention satisfies the following conditions:

(1) The refractive index on the spectrum d-line of all positive lenses lies between 1.6 and 1.8;

(2) $0.03 < N_2 - N_1 < 0.1$ (3) $N_6 < N_5 < N_7$, $0.07 < N_7 - N_6 < 0.15$ (4) $0.15F < d_1 + d_2 < 0.25\ F$
$0.05 < d_3 + d_4 < 0.15\ F$
$0.1\ F < d_5 + d_6 + d_7 < 0.25\ F$ (5) $0.2\ F < s_2 < 0.3\ F$ (6) $0.4\ F < R_2 < 0.6\ F, 2 < R_3°R_1 < \infty$
$1 < R_4/R_6 < 2, 1 < R_{10}/R_7 < 2$ (7) $0.49\ F < R_1 < 0.8\ F$
$0.35\ F < R_5 < 0.65\ F$
$0.17\ F < R_6 < 0.37\ F$
$0.27\ F < R_7 < 0.47\ F$
$0.2\ F < R_8 < 0.4\ F$
$F < R_9 < 5\ F$
$F < R_{11} < 3\ F$
$F < R_{12} < 2\ F$ The following is an embodiment of the photographic objective according to the present invention where the focal length is $F=1$, and the angle of view $2\alpha = 63°$ and the aperture ratio is 1:1.4 and the Abbe number of each lens element is denoted in the order of the alignment by reference symbols $v_1$, $v_2$, ...:

| | | | |
|---|---|---|---|
| $R_1 = 0.689$ | $d_1 = 0.025$ | $N_1 = 1.63980$ | $v_1 = 34.6$ |
| $R_2 = 0.504$ | $d_2 = 0.175$ | $N_2 = 1.69100$ | $v_2 = 54.8$ |
| $R_3 = 2.002$ | $s_1 = 0.003$ | | |
| $R_4 = 0.365$ | $d_3 = 0.078$ | $N_3 = 1.74400$ | $v_3 = 44.9$ |
| $R_5 = 0.508$ | $d_4 = 0.025$ | $N_4 = 1.64769$ | $v_4 = 33.9$ |
| $R_6 = 0.266$ | $s_2 = 0.257$ | | |
| $R_7 = -0.369$ | $d_5 = 0.055$ | $N_5 = 1.64250$ | $v_5 = 58.09$ |
| $R_8 = -0.254$ | $d_6 = 0.020$ | $N_6 = 1.59270$ | $v_6 = 35.4$ |
| $R_9 = -3.302$ | $d_7 = 0.119$ | $N_7 = 1.71300$ | $v_7 = 53.89$ |
| $R_{10} = -0.545$ | $s_3 = 0.001$ | | |
| $R_{11} = -2.149$ | $d_8 = 0.100$ | $N_8 = 1.72000$ | $v_8 = 50.31$ |
| $R_{12} = -1.366$ | | | |

The graphs of the spherical abberation, sine condition, astigmatic aberration, image curvature and distortion in the above embodiment are illustrated in Figs. 2, 3, and 4. In Fig. 2, the heavier chain line $SA_d$ is the spherical aberration graph of the spectrum d-line; the heavier full line $SC_d$ the graph of the deviation of such d-line from the sine condition; the fine chain line $SA_g$ the spherical aberration graph of the spectrum g-line; and the fine line $SC_g$ the deviation graph of such g-line from the sine condition. In Fig. 3, the heavy solid line $A_s$ is the graph of the sagital field curvature and the broken line $A_m$ that of the meridional field curvature, while in Fig. 4 solid line D is the graph of the distortion for each angle of incidence.

Heretofore, it has been impossible to attain an aperture ratio beyond $f:1.7$ for a wide angle objective of an image angle of 63°, since the essential condition to obtain a wider image angle, that is, correction of aberration in image curvature, and another essential condition to attain an improvement in photographic power, that is, correction in spherical aberration, naturally conflict with each other in its own structural condition. This is absolutely inevitable so long as the conventional structural system and the known glass materials are used. The need to overcome this difficulty has been a critical requisite, and the present invention has as a particular object the elimination thereof by satisfying the conflicting two essential conditions with the aid of specifically devised glass of low dispersive power and high refractive index recently introduced, and its overall utilization and intelligently devised structural system corresponding thereto. In such objective a glass of a low dispersive power and high refractive index, having a refractive index between 1.6 and 1.8, is utilized for all positive lens elements thereby to reduce to a minimum the loss entailed in other aberrations and thus to improve correction of spherical aberration. Furthermore, the first component is composed of two elements of specific shape cemented together, using a negative meniscus lens for its first element, so that remarkable improvement is attained in the desired correction of its image curvature without impairing the correction of spherical aberration. It should be noted that in an objective of an aperture ratio of around $f:1.4$, coma is undeniably aggravated in the general case. On the contrary, the objective according to the present invention provides strong converging power to the radii of curvature of the lens surfaces, $R_2$ of the first component and $R_8$ of the third component, as well. Furthermore, the axial thickness of the air space between the surface of the second component and the adjacent surface of the third component $s_2$ is given a value between about 0.2 F and 0.3 F so that the aggravation in coma is satisfactorily eliminated. It is another advantage of the objective according to the present invention that the overall thickness of the whole structure is designed to the conceivable minimum so that vignetting, prone to occur in conventional high aperture wide angle objectives, is held to a practical minimum.

What is claimed is:

1. A high aperture wide angle photographic objective comprising four axially aligned components consisting of eight lens elements, a first component of positive power consisting of two lens elements cemented in the order of negative and positive lens elements positioned with its cemented surface of converging power convex towards the object, a second component of negative meniscus shape consisting of two lens elements cemented in the order of positive and negative lens elements with its convex outer surface towards the object, a third component of negative meniscus shape consisting of three lens elements cemented in the order of positive, negative and positive lens elements with its concave outer surface towards the object, a fourth component of a bi-convex positive lens; the objective satisfying the following conditions, when the focal length is denoted by F, the radius of curvature of the surface of each lens element in the order of the alignment by $R_1$, $R_2$, . . . the refractive index on the spectrum $d$-line of each lens element in the order of the alignment by $N_1$, $N_2$, . . . the thickness of the lens element at the optical axis in the order of the alignment by $d_1$, $d_2$, . . . and the thickness of the air space between adjacent surfaces of each component at the optical axis in the order of the alignment by $s_1$, $s_2$, . . . :

(1) The refractive index on the spectrum $d$-line of all positive lenses is between 1.6 and 1.8;

(2) $0.03 < N_2 - N_1 < 0.1$ (3) $N_6 < N_5 < N_7 0.07 < N_7 - N_6 < 0.15$ (4) $0.15 F < d_1 + d_2 < 0.25 F$
$0.05 F < d_3 + d_4 < 0.15 F$
$0.1 F < d_5 + d_6 + d_7 < 0.25 F$ (5) $0.2 F < s_2 < 0.3 F$ (6) $0.4 F < R_2 < 0.6 F 2 < R_3/R_1 < \infty$
$1 < R_4/R_6 < 2, 1 < R_{10}/R_7 < 2$ and (7) $0.49 F < R_1 < 0.8 F$
$0.35 F < R_5 < 0.65 F$
$0.17 F < R_6 < 0.37 F$
$0.27 F < R_7 < 0.47 F$
$0.2 F < R_8 < 0.4 F$
$F < R_9 < 5 F$
$F < R_{11} < 3 F$
$F < R_{12} < 2 F$ 2. A high aperture wide angle photographic objective with improved spherical aberration and curvature of image field correction of four axially aligned, air spaced components, the first component being of positive power and consisting a first negative lens cemented to a first positive lens and convex towards the object side of the objective, the second component of negative meniscus shape and consisting of a second positive lens and a second negative lens cemented to each other and convex to the object side of the objective, the third component being of negative meniscus shape and consisting of a third positive, a third negative and a fourth positive intercemented in that order and concave to the object side of the objective, and a biconvex fourth component, in which objective the radii of curvature $R_{\text{subscript}}$ of the individual lens surfaces in succession from the object side of the objective, the distances $d_{\text{subscript}}$ at the optical axis of the lens thicknesses, the spacings $s_{\text{subscript}}$ between air spaced lens surfaces at the optical axis, the refractive indices $N_{\text{subscript}}$ of the $d$-line, the dispersion factors $v_{\text{subscript}}$ of the individual lenses, the focal length F, and the aperture ratio $f$, are numerically as follows:

| Lens | Radius of Curvature | Axial Distance | Refractive Index | Dispersion Factor |
|------|---------------------|----------------|------------------|-------------------|
| $L_1$ | $R_1 = 0.689$ | $d_1 = 0.025$ | $N_1 = 1.63930$ | $v_1 = 34.6$ |
| $L_2$ | $R_2 = 0.504$ | $d_2 = 0.175$ | $N_2 = 1.69100$ | $v_2 = 54.8$ |
|      | $R_3 = 2.002$ | $s_1 = 0.003$ | | |
|      | $R_4 = 0.365$ | | | |
| $L_3$ | $R_5 = 0.508$ | $d_3 = 0.078$ | $N_3 = 1.74400$ | $v_3 = 44.9$ |
| $L_4$ | $R_6 = 0.266$ | $d_4 = 0.025$ | $N_4 = 1.64769$ | $v_4 = 33.9$ |
|      | $R_7 = -0.369$ | $s_2 = 0.257$ | | |
| $L_5$ | $R_8 = -0.254$ | $d_5 = 0.055$ | $N_5 = 1.64250$ | $v_5 = 58.09$ |
| $L_6$ | $R_9 = -3.302$ | $d_6 = 0.020$ | $N_6 = 1.59270$ | $v_6 = 35.4$ |
| $L_7$ | $R_{10} = -0.545$ | $d_7 = 0.119$ | $N_7 = 1.71306$ | $v_7 = 53.89$ |
|      | $R_{11} = 2.149$ | $s_3 = 0.001$ | | |
| $L_8$ | $R_{12} = -1.366$ | $d_8 = 0.100$ | $N_8 = 1.7200$ | $v_8 = 50.31$ |

References Cited in the file of this patent

UNITED STATES PATENTS

| | | |
|---|---|---|
| 1,899,934 | Berek | Mar. 7, 1933 |
| 2,171,640 | Berek | Sept. 5, 1939 |
| 2,549,159 | Bertele | Apr. 17, 1951 |
| 2,645,973 | Ito | July 21, 1953 |
| 2,724,994 | Lange | Nov. 29, 1955 |
| 2,779,239 | Ito | Jan. 29, 1957 |

FOREIGN PATENTS

| | | |
|---|---|---|
| 376,044 | Great Britain | July 7, 1932 |
| 685,572 | Germany | Dec. 20, 1939 |